S. A. HORTON.
WELL DRILLING APPARATUS.
No. 11,446. Reissued Oct. 16, 1894.
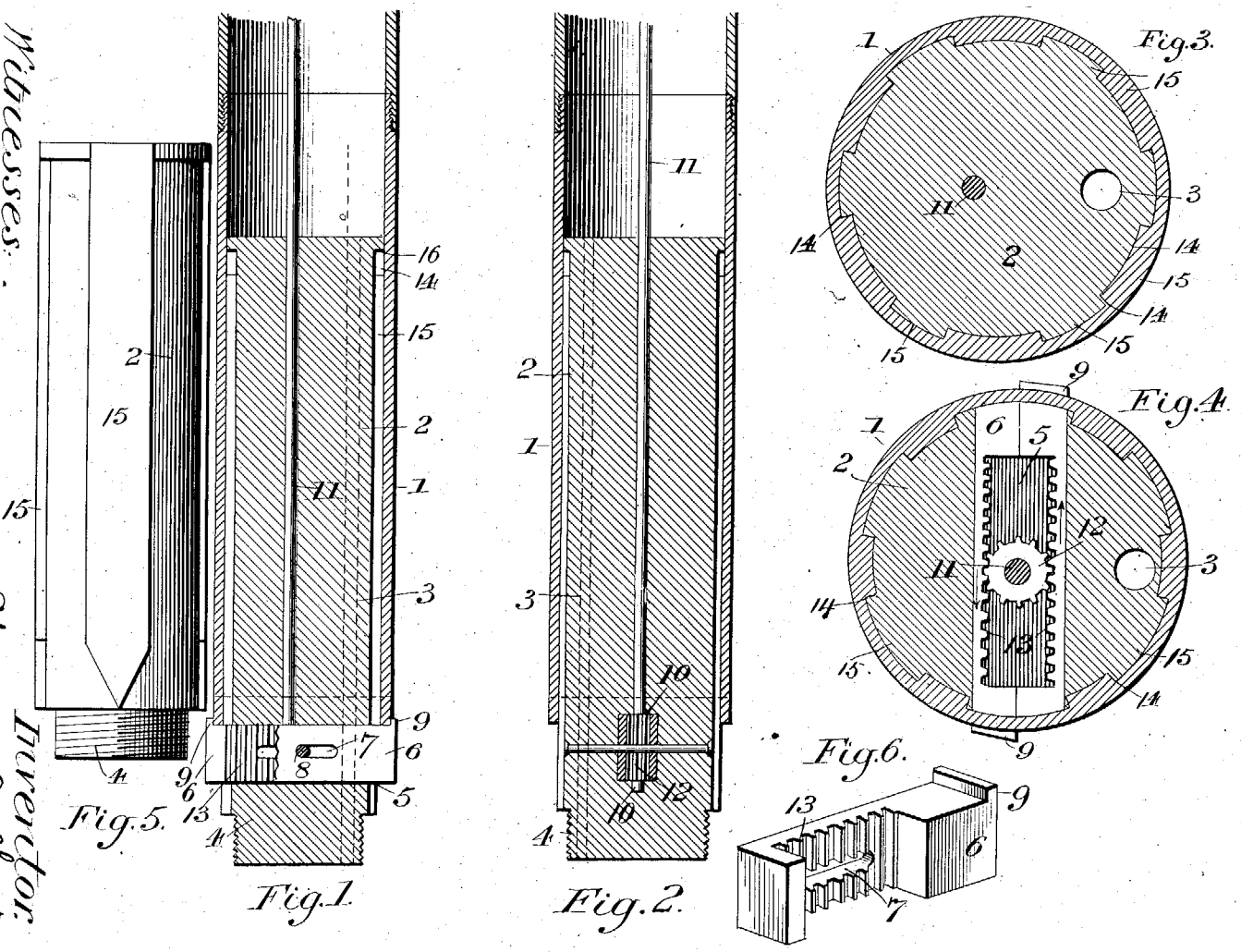
Witnesses:
C. M. Galan
D. G. Wood
Inventor:
Stephen A. Horton
by C. H. Howard & Co
attorneys

UNITED STATES PATENT OFFICE.

STEPHEN A. HORTON, OF CLARKSVILLE, TEXAS.

WELL-DRILLING APPARATUS.

SPECIFICATION forming part of Reissued Letters Patent No. 11,446, dated October 16, 1894.

Original No. 519,405, dated May 8, 1894. Application for reissue filed September 21, 1894. Serial No. 523,755.

*To all whom it may concern:*

Be it known that I, STEPHEN A. HORTON, a citizen of the United States, residing at Clarksville, in the county of Red River and State of Texas, have invented a new and useful Well-Drilling Apparatus, of which the following is a specification.

My invention relates to improvements in well sinking or drilling apparatus, and especially to bit-securing devices, and it contemplates the provision of simple and efficient means for accomplishing the attachment and detachment of the drill bits without the removal of the well tubing from the hole.

In carrying out my invention I employ essentially a stem or core carrying the drill bit and adapted to fit snugly in the bore of the tubing, together with a simple combination of devices whereby such stem or core can be locked against longitudinal and rotary movement by the manipulation of an operating-rod which extends to the top of the well.

My invention will be more fully described hereinafter in connection with the drawings, and the novel features thereof will be particularly pointed out in the appended claims.

In the drawings: Figure 1 is a vertical central section of the lower end of a well tubing, showing bit-securing devices embodying my invention applied in the operative position thereto. Fig. 2 is a central vertical section, taken at right angles to the plane of Fig. 1. Fig. 3 is a horizontal transverse sectional view on the line 3—3 of Fig. 1. Fig. 4 is a similar view on the line 4—4 of Fig. 1. Fig. 5 is a detail view of the core or stem, showing the adjustable rests in their folded positions. Fig. 6 is a detail view in perspective of one of the rests.

Similar numerals of reference indicate corresponding parts in all the figures of the drawings.

In the construction illustrated, 1 represents the lowermost section of a well tubing, which, for convenience, I will term the stock, in that it is a special section and is provided with certain structural features to co-operate with other parts of my invention.

Fitting in the drill stock 1, as shown in Fig. 1, is a cylindrical core or stem 2, which is vertically perforated, as shown at 3, to admit water to the drilling tool in the ordinary way, the lower end of such core or stem being threaded, as shown at 4, to engage a drill bit (not shown) of the ordinary or any preferred construction of the expansion type. The core or stem is provided, near its lower end, with a transverse rectangular cavity 5, in which are fitted duplicate laterally-adjustable rests 6. These rests are in the form of plates and are slotted, as at 7, to receive a perpendicularly-disposed guide-pin 8, and are further provided at their outer extremities with upstanding detents 9, which are adapted, when the rests are extended, as shown in Fig. 1, to engage or contact with the outer surface of the tubing.

Rotatably mounted in a bore 10, which is parallel with the axis of the core, is an operating-rod 11, provided at its lower end within the cavity 5, with a spur-wheel or pinion 12, which is arranged between and in contact with the contiguous inner or opposing faces of the rests, the latter being arranged in adjacent parallel planes. Said inner faces of the rests are toothed or serrated, as shown at 13, to mesh with the teeth of the spur-wheel or pinion. Inasmuch as the toothed or serrated rests engage or mesh with opposite sides of the spur-wheel or pinion, it will be understood that, by turning the operating-rod in one direction, the rests will be extended, as shown by the arrow in Fig. 4, and by turning said rod in the opposite direction the rests will be retracted and will fold within the cavity 5 to leave the core or stem with an unbroken exterior surface. The operating-rod extends to the top of the well, whereby the locking devices may be manipulated from that point.

Thus far I have described means for holding the bit and stock from relative longitudinal movement; and it will be understood that various well-known means may be utilized in this connection to prevent independent rotary movement of such parts. I prefer, however, to provide the contiguous faces of the core or stem and the stock with interlocking grooves 14 and ribs 15, the grooves in the exterior surface of the core or stem receiving the ribs upon the interior surface of the stock, and vice versa. The upper ends of the grooves 14, in the exterior surface of the core or stem, are closed by means of stops or flanges 16, the distance between said stops or flanges and the upper edges of the rests being somewhat greater, as shown by a comparison of the drawings, than the lengths of the ribs 15 upon the surface of the stock, for a purpose to be hereinafter explained.

When it is desired to apply a drill bit to the lower end of the well tubing, said bit is attached, by means of the threads 4, to the lower end of the core or stem, the latter being as shown in Fig. 5, in which the rests are folded within the cavity 5. The core or stem is now lowered into the tubing and is allowed to drop until the ribs and grooves upon the contacting faces of the bit and stock interlock as above described. The descent of the core or stem is finally checked by the contact with the upper ends of the ribs carried by the stock of the stops or flanges 16, at the upper ends of the grooves in the core or stem, in which position said core or stem projects below the lower end of the stock a sufficient distance to enable the adjustable rests to be extended freely under the edge of the same. The operating-rod is now turned in the direction indicated by the arrow in Fig. 4, and the rests are extended until the detents 9 lie outside of the plane of the outer surface of the stock, after which the tubing is allowed to settle until the lower edge of the stock bears upon the upper edges of the rests between the surface of the core or stem and the detents 9.

To disengage and remove a drill bit when secured in place by the means herein described, the well tubing is elevated slightly, by means of a screw-jack or other similar apparatus, the operating-rod is rotated to retract the slidable rests until they are received wholly within the cavity 5, when the core or stem and bit may be withdrawn through the tubing.

It will be understood that in carrying out my invention it may be found necessary to make various changes in the form, proportion, and minor details of construction, and I wish it to be understood that the same may be resorted to without departing from the spirit or sacrificing any of the advantages of the invention.

Having described the invention, what I claim is—

1. The combination with a drill stock, of a bit-carrying core or stem fitting therein, longitudinally-movable rests mounted in a cavity near the lower end of the core or stem and provided with suitable guiding devices, a spur or pinion arranged between the planes of said rests and engaging their facing toothed or serrated surfaces, and means to operate said spur or pinion, substantially as specified.

2. The combination with a drill stock provided with interior spaced ribs, of a bit-carrying core or stem provided with exterior grooves to receive said ribs, the upper ends of said grooves being closed, and locking devices carried by the core or stem to engage the lower edge of the stock, substantially as specified.

3. The combination of a drill stock provided with interior alternate ribs and grooves, a core or stem fitting within said stock and provided with corresponding alternate grooves and ribs to interlock with those of the stock, the grooves of the core or stem being closed at their upper ends by stops or flanges to engage the upper ends of the ribs of the stock, adjustable rests carried by the core or stem, and means to extend the same to engage the lower end of the stock, substantially as specified.

In testimony that I claim the foregoing as my own I have hereto affixed my signature in the presence of two witnesses.

STEPHEN A. HORTON.

Witnesses:
C. E. DOYLE,
J. H. SIGGERS.